US008875035B2

(12) United States Patent
Gehani et al.

(10) Patent No.: US 8,875,035 B2
(45) Date of Patent: Oct. 28, 2014

(54) GRAPHICAL REPRESENTATION OF OUT-OF-BOUND IMAGE SELECTION

(75) Inventors: Samir Gehani, Sunnyvale, CA (US); Ty Rayner, San Jose, CA (US); Conrad Carlen, Burnlingame, CA (US)

(73) Assignee: Apple Inc., Cupertino, CA (US)

( * ) Notice: Subject to any disclaimer, the term of this patent is extended or adjusted under 35 U.S.C. 154(b) by 628 days.

(21) Appl. No.: 12/475,299

(22) Filed: May 29, 2009

(65) Prior Publication Data
US 2010/0306684 A1    Dec. 2, 2010

(51) Int. Cl.
*G06F 3/048* (2013.01)
*G06F 3/0484* (2013.01)

(52) U.S. Cl.
CPC .................................. *G06F 3/04845* (2013.01)
USPC ........................................... 715/765; 715/781

(58) Field of Classification Search
USPC .................................................. 715/765, 781
See application file for complete search history.

(56) References Cited

U.S. PATENT DOCUMENTS

| | | | |
|---|---|---|---|
| 5,469,536 A | 11/1995 | Blank | |
| 5,973,689 A * | 10/1999 | Gallery | 715/859 |
| 7,092,957 B2 * | 8/2006 | Klein | 1/1 |
| 2003/0052922 A1 * | 3/2003 | Hidai | 345/781 |
| 2006/0200775 A1 * | 9/2006 | Behr et al. | 715/767 |
| 2007/0100713 A1 * | 5/2007 | Del Favero et al. | 705/29 |
| 2008/0143739 A1 | 6/2008 | Harris et al. | |
| 2008/0198175 A1 * | 8/2008 | Sun et al. | 345/629 |

OTHER PUBLICATIONS

NPDP.pdf.*
"Lasso tool—Photoshop tool explained," Jan. 1, 2001, http://www.ephotozine.com/article/Lasso-tools-Photoshop-tool-explained-4615, pp. 1-5.
"Plot Cadpipe drawings with hidden lines," http://www.cadpipe.com/userTips/utPlotHiddenLines.html, pp. 1-2.

* cited by examiner

*Primary Examiner* — Peiyong Weng
(74) *Attorney, Agent, or Firm* — Kilpatrick Townsend & Stockton LLP

(57) ABSTRACT

This is directed to differentiating between portions of a selection area that are within the boundary of displayed information and portions of the selection area that are beyond the boundary of the displayed information. In some embodiments, the graphical representation of the selection area can change based on the position of the selection area relative to the boundary of the displayed information. In particular, the representation of portions or regions of the selection area that are within the boundary of the displayed information can be different than the representation of the portions or regions of the selection area that extend beyond the boundary of the displayed information. For example, the electronic device can provide different fills in each of the regions, or different line patterns around the peripheries of each of the selection area regions.

4 Claims, 9 Drawing Sheets

GRAPHICAL REPRESENTATION OF OUT-OF-BOUND IMAGE SELECTION

FIELD OF THE INVENTION

This is directed to providing a graphical representation of a selection area that extends beyond the periphery of a displayed object. In particular, this is directed to defining a selection area for selecting a portion of a displayed object, such as an image, where a portion of the selection area extends beyond the boundary of the image and is graphically distinguished from the portion of the selection area that is within the boundary of the image.

BACKGROUND OF THE INVENTION

Using an electronic device, a user can display different types of information. For example, the electronic device can display images, graphics, text documents, or other information. The displayed information can be bound by boundaries extending around the periphery of the information. For example, an image can be limited by a periphery extending around the image. In some cases, a user may wish to select portions of the displayed information. For example, a user may wish to select a portion of a displayed image to copy and paste to another document. The user can select a portion of the displayed image by placing a selection area over the displayed information.

In some cases, the selection area can extend or be moved beyond the boundary of the displayed information. As portions of the selection area extend beyond the boundary, the user shown selection area can be restricted to the boundary of the information (e.g., because the portions of the area beyond the boundary cannot be selected). If the user defined the selection area to have specific dimensions, however, the user may have difficultly placing the entire selection area along a boundary of the information. In addition, the user may have difficulty knowing how far the selection area extends beyond the boundary of displayed information.

SUMMARY OF THE INVENTION

This is directed to systems, methods and computer-readable media for differentiating between portions of a selection area that are within and out of the boundary of displayed information. In particular, this is directed to changing the appearance of portions of a selection area based on the relative position of the area over the displayed information.

Using an electronic device, a user can display information within a predetermined boundary. For example, a user can display an image or other type of document having a boundary. The user may wish to select part of the image, for example to copy and paste to another document. As another example, the user may wish to provide part of the image to another application (e.g., an email application). To select the part of the image, the user can use a selection tool to define a selection area to overlay on the image. The selection tool can have any suitable shape, including for example rectangular, oval, lasso, or any other shape. The user can define any suitable size for the selection area, including for example a size that is smaller than the image size.

To select a desired part of the image or other displayed information, the user can drag the selection area over the image. As the user drags the selection area, some or all of the selection area can extend beyond the boundary of the information. To identify the exact part of the image being selected, the electronic device can insert an area representation along the portions of the boundary of the information that are within the selection area. This can show a user that the portions of the display that are enclosed by the selection area but outside of the information boundary are not actually selected.

The user, however, may not know how much of the selection area extends beyond the boundary of the information. If the user had defined the selection area to be of a specific size or shape of interest (e.g., a perfect square matching the size of window in another application), the user may have difficulty ensuring that the entirety of the selection area is within the information boundary. To provide visual feedback to the user, the electronic device can change the representation of the selection area based on the position of the selection area relative to the boundary of the displayed information. For example, the selection area can include a first representation for the portions of the selection area within the boundary of the displayed information, and a second representation for the portions of the selection area that are beyond the displayed boundary. Any suitable representation can be used, including for example dashed lines, opacity variations, color, line thickness, or any other change in representation.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to providing a graphical representation of a selection area that extends beyond the boundary of a displayed object. The graphical representation can include different regions differentiating the portions of the displayed object actually selected, and the portions of the selection area that are not selecting any information.

Figure 1:
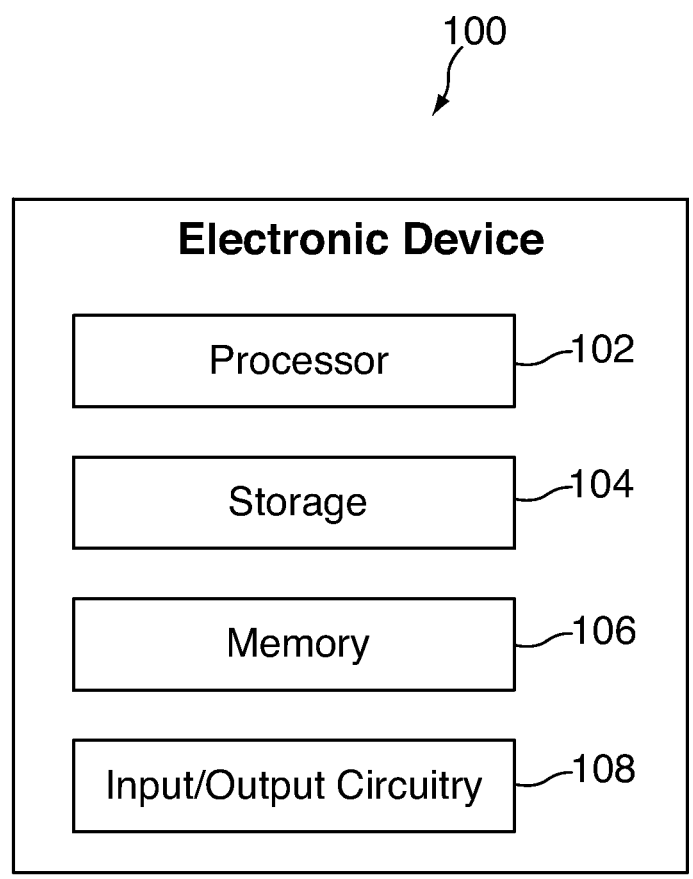
FIG. 1 is a schematic view of an illustrative electronic device for selecting an area in a display in accordance with one embodiment of the invention.

FIG. 1 is a schematic view of an illustrative electronic device for selecting an area in a display in accordance with one embodiment of the invention. Electronic device 100 can include any suitable type of electronic device operative to display information to a user. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a gaming device, a camera, radios, medical equipment, and any other portable electronic device having a display from which a user can select a portion of displayed objects.

Electronic device 100 can include a processor or control circuitry 102, storage 104, memory 106 and input/output circuitry 108, as typically found in an electronic device of the type of electronic device 100, and operative to enable any of the uses expected from an electronic device of the type of electronic device 100 (e.g., connect to a host device for power or data transfers). In some embodiments, one or more of electronic device components 100 can be combined or omitted (e.g., combine storage 104 and memory 106), electronic device 100 can include other components not combined or included in those shown in FIG. 1 (e.g., communications circuitry or positioning circuitry), or electronic device 100 can include several instances of the components shown in FIG. 1. For the sake of simplicity, only one of each of the components is shown in FIG. 1.

Control circuitry 102 can include any processing circuitry or processor operative to control the operations and performance of electronic device 100. Storage 104 can include, for example, one or more storage mediums including a hard-drive, solid state drive, flash memory, permanent memory such as ROM, any other suitable type of storage component, or any combination thereof. Memory 106 can include cache memory, semi-permanent memory such as RAM, and/or one or more different types of memory used for temporarily storing data. In some embodiments, memory 106 and storage 104 can be combined as a single storage medium. Input/output circuitry 108 can be operative to convert (and encode/decode, if necessary) analog signals and other signals into digital data. Input/output circuitry 108 can be coupled to or include any suitable input interface, such as for example, a button, keypad, dial, a click wheel, or a touch screen, as well as any suitable output circuitry associated with output devices (e.g., audio outputs or display circuitry or components).

In some embodiments, electronic device 100 can include a bus operative to provide a data transfer path for transferring data to, from, or between control processor 102, storage 104, memory 106, input/output circuitry 108, and any other component included in the electronic device.

Using the electronic device, a user can display any suitable information. For example, the electronic device can display images, objects, documents, or any other suitable information. The displayed information can be restrained within a boundary, for example the boundary of an image or of a document. In some embodiments, a user may wish to select only a portion of the displayed information. To do so, a user can trace or draw a selection area on the displayed information, such that the portions of the information placed within the selection area are selected. The user can then cut, copy or paste the selected portion of the information (e.g., copy and paste part of an image in an email message or in another application.

Figure 2A:
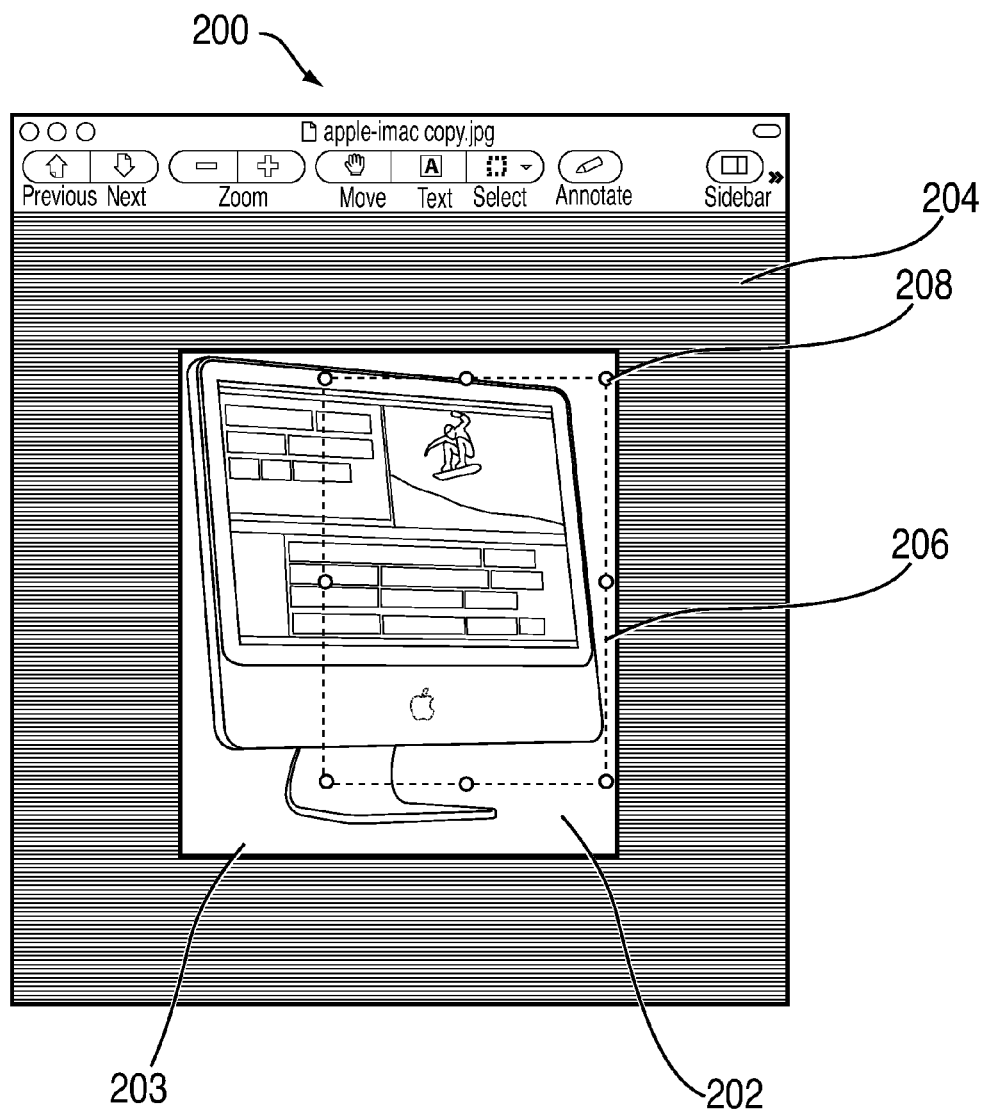
FIGS. 2A-2C are schematic views of illustrative displays of information with overlaid selection areas in accordance with one embodiment of the invention.
Figure 2B:
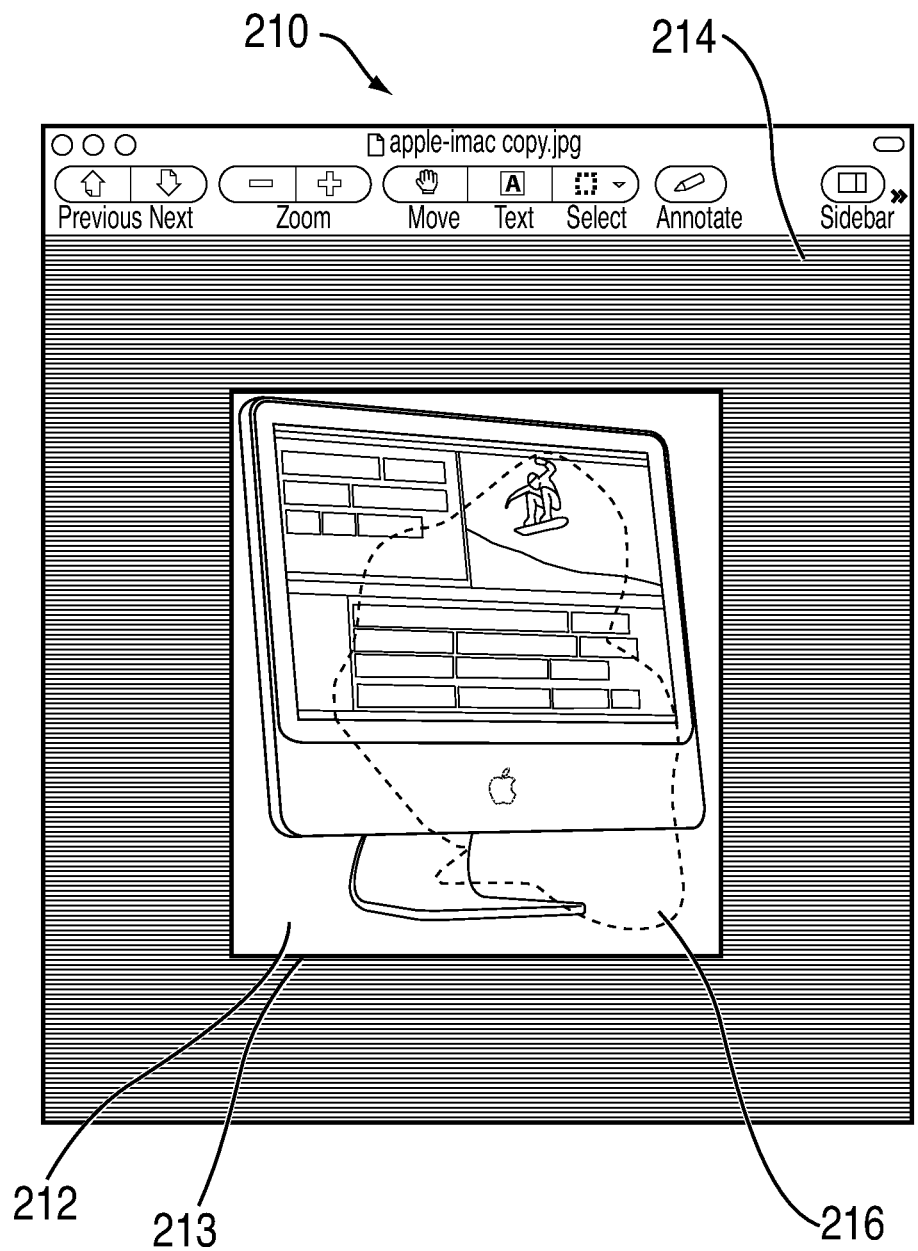
Figure 2C:
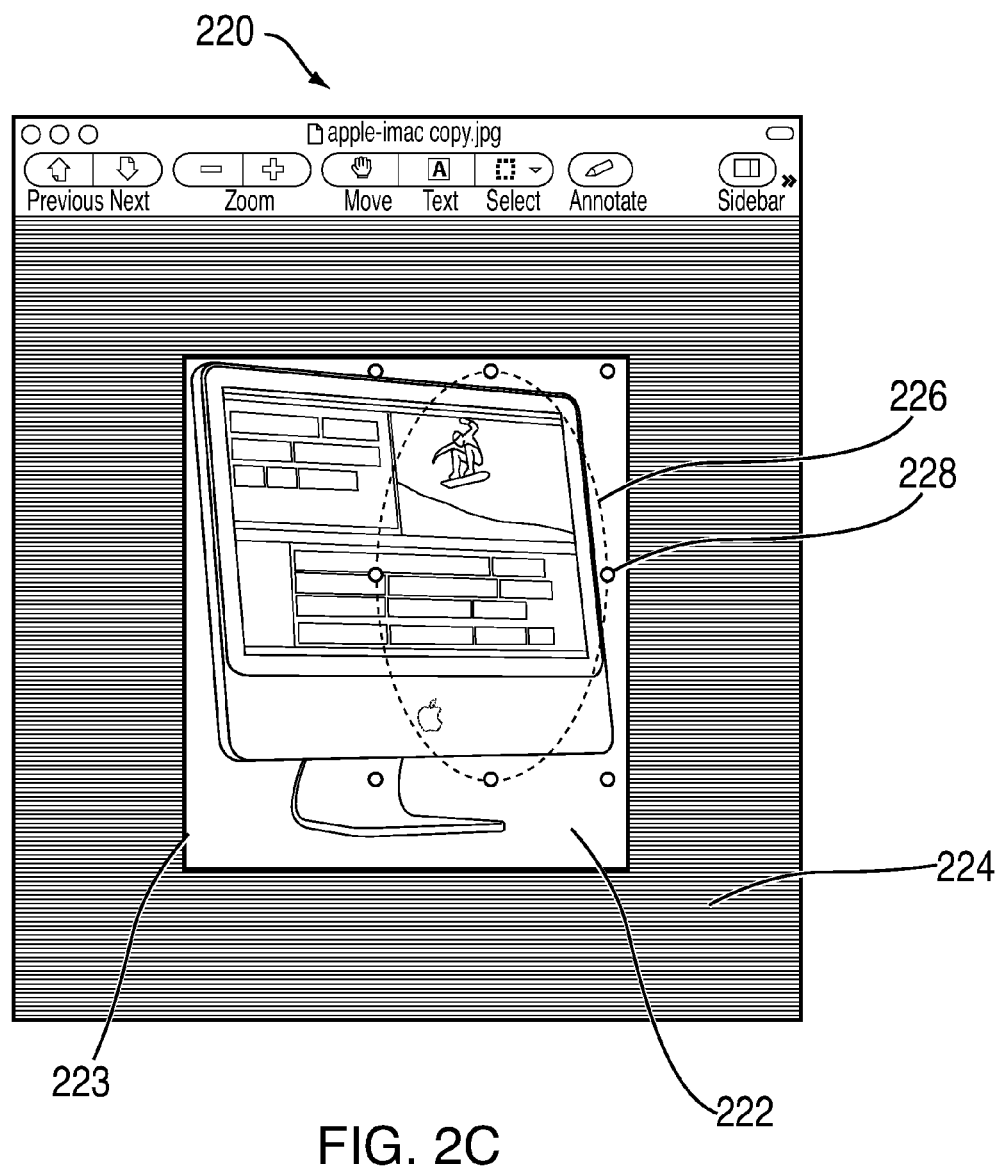

FIGS. 2A-2C are schematic views of illustrative displays of information with overlaid selection areas in accordance with one embodiment of the invention. Display 200 includes application window 204 in which image 202 is displayed. Similarly, display 210 includes application window 214 in which image 212 is displayed, and display 220 includes application window 224 in which image 222 is displayed. Although the examples of the following discussion may be in the context of images, it will be understood that the discussion can apply to any other suitable object displayed by the electronic device. In particular, it will be understood that the discussion can apply to three-dimensional objects displayed by the device, including for example selections of two or three dimensional surfaces of the three-dimensional objects, or three-dimensional volumes within three-dimensional objects. It will also be understood that embodiments of the discussion can apply to selecting part of a displayed timeline (e.g., with a selection area having a known size associated with a known duration).

Each image can be defined by a boundary (e.g., boundaries 203, 213 and 223, respectively), which may be within their respective application windows. This can allow a user to manipulate the image or apply tools to the images along and beyond the boundary of the image (e.g., by stretching the tool or using the tool in the portions of the application window that do not include the image).

The user can select a portion of a displayed image using any suitable selection tool. For example, the user can use a rectangular selection tool defining rectangular selection area 206. As another example, the electronic device can use a lasso selection tool defining lasso selection area 216. As still another example, the electronic device can use an oval selection tool defining oval selection area 216. Any other shape or combination of shapes (e.g., using addition, subtraction, union and intersection operations) can be used to define a selection area. Once drawn, a user can modify a displayed selection area, for example by selecting a side or element of the selection area (e.g., selecting a line of lasso selection area 216) or by selecting stretch points (e.g., stretch points 208 or 228) associated with the selection area.

The electronic device can graphically represent the selection area using any suitable approach. In some embodiments, a line (e.g., a dashed line) following the periphery of the selection area can define the boundary of the selection area. The line can be distinguished from the image using any suitable approach, including for example based on the line thickness, color, pattern, stretch points (e.g., larger selectable options associated with the selection area), or any other suitable approach. In some embodiments, the line can include an animation (e.g., marching ants depicted by blinking dashes). When the entirety of the selection area is within the image, the electronic device can provide a uniform representation for the area (e.g., a single and continuous line pattern). In some embodiments, the electronic device can instead or in addition include a filling or pattern within the selection area.

Figure 3A:
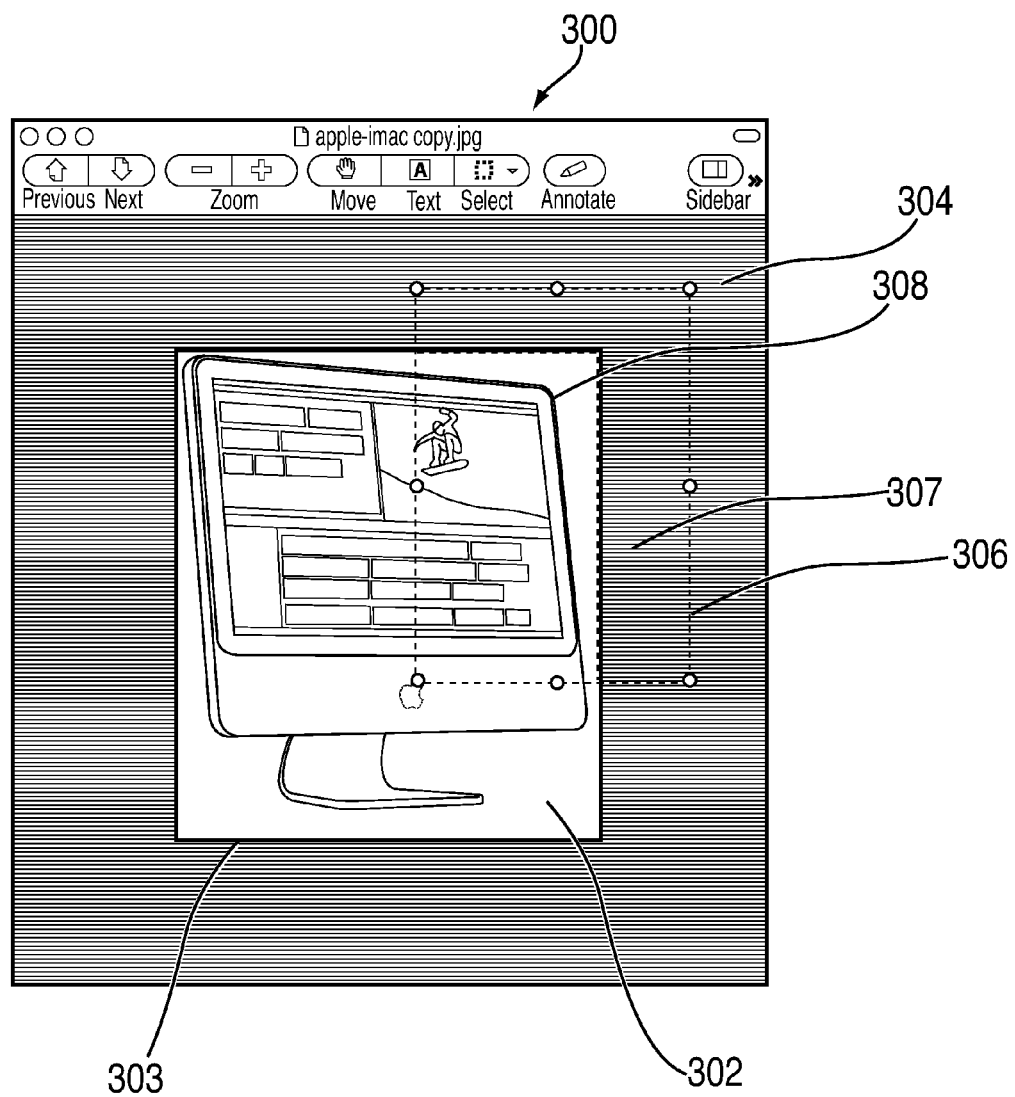
FIGS. 3A-3C are schematic views of the respective displays of FIGS. 2A-2C when the selection areas are moved in accordance with one embodiment of the invention.
Figure 3B:
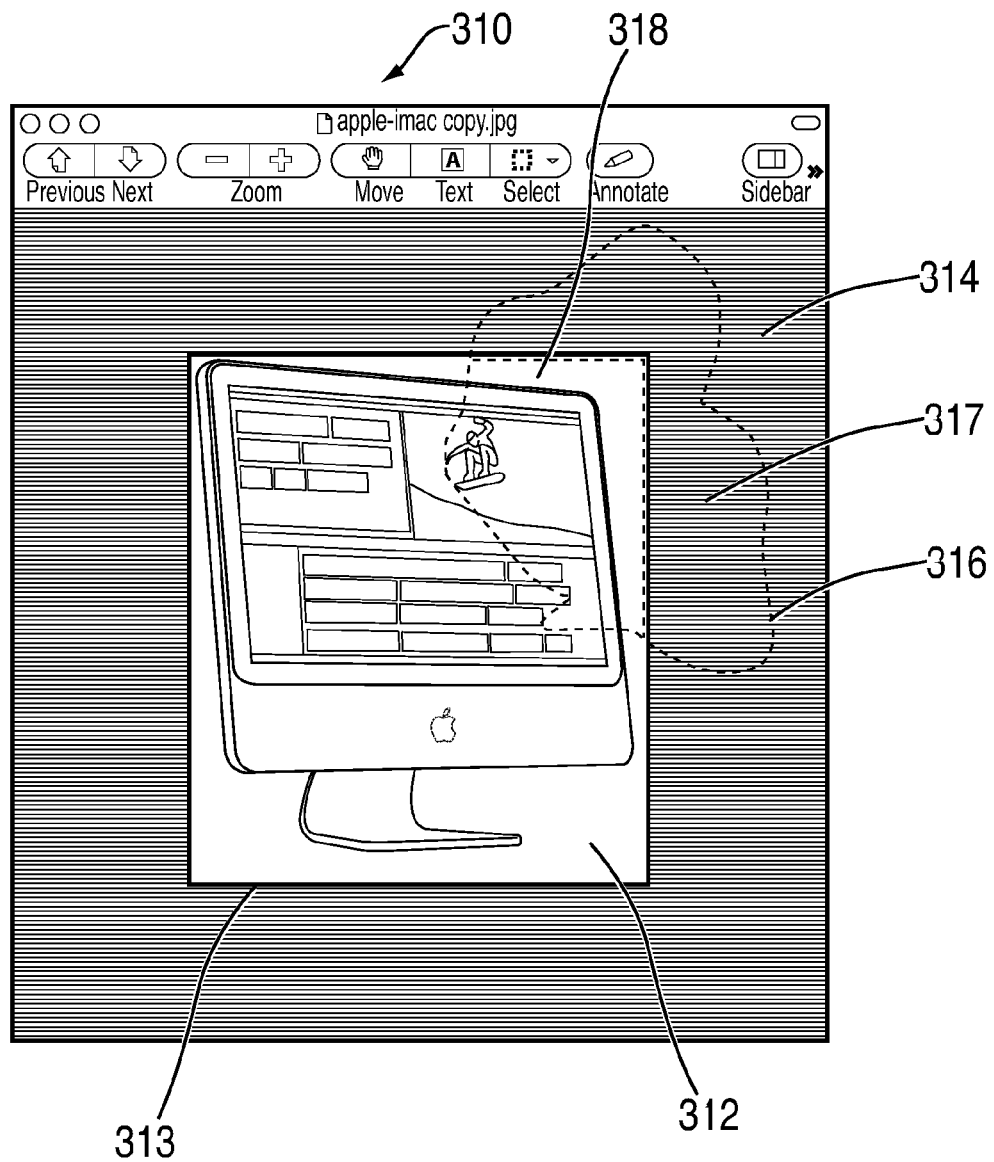
Figure 3C:
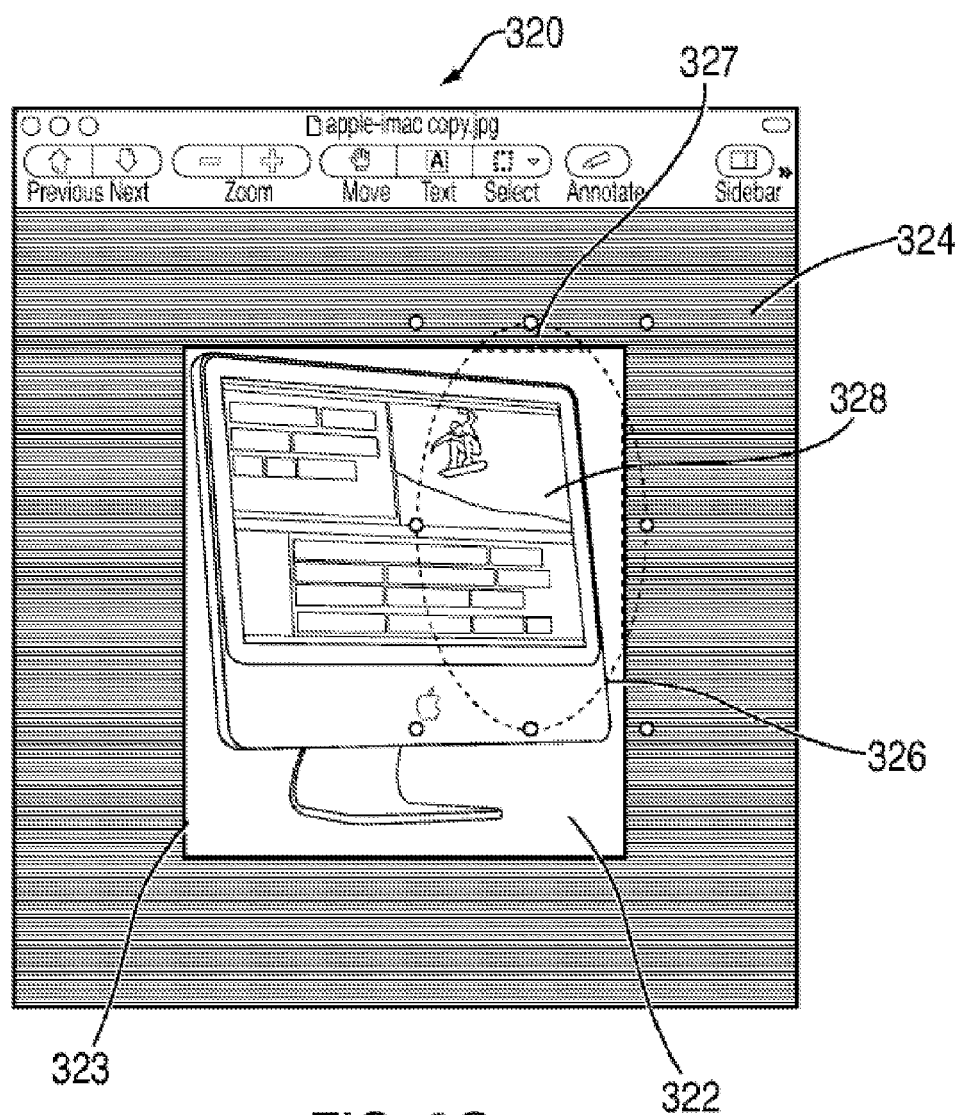

In some cases, a user may wish to move the selection area to select a different portion of the image. For example, a user may wish to capture a particular element of the image, but within the drawn selection area (e.g., if the selection area dimensions are specifically selected based on criteria of importance to the user). The application in which the image is displayed may allow the user to select the selection area, and drag the selection area over the image to a position of interest to the user. FIGS. 3A-3C are schematic views of the respective displays of FIGS. 2A-2C when the selection areas are moved in accordance with one embodiment of the invention. Display 300 includes application window 304 in which image 302 is displayed. Similarly, display 310 includes application window 314 in which image 312 is displayed, and display 320 includes application window 324 in which image 322 is displayed. Each image can be defined by a boundary (e.g., boundaries 303, 313 and 323, respectively), which may be within their respective application windows. The user can select portions of each image using selection areas 306, 316 and 326 respectively. For example, the user can draw each of the selection areas, or can instead or in addition move (e.g., drag) a previously drawn selection area to the position shown in each of displays 300, 310 and 320.

In some embodiments, the selection areas can be displaced such that portions of the selection area extend beyond the boundary (e.g., boundary 303, 313 or 323) of the image. When a portion of the selection area extends beyond the boundary of the image, the content within the entirety of the selection area may not be selected in response to a corresponding user instruction (e.g., a copy instruction). In particular, only the portions of the selection area that are within the boundary of the image may actually be selected. The electronic device can provide any suitable feedback to the user to ensure that the user understands which portion of the image will actually be selected based on the selection area position. In some embodiments, the electronic device can alter the displayed selection area to match the boundaries of the images for the portions of the selection area that extend beyond the boundary. This approach, however, can prevent the user from determining how much of the selection area is beyond the boundary of the image.

Alternatively, the electronic device can modify the graphical representation of the selection area to distinguish between the portions of the selection area that will be selected (e.g., the portions of the selection area within the image boundary) and the portions of the selection area that will not be selected. For example, the electronic device can graphically distinguish region 308 (the intersection of selection area 306 and image 302, which will be selected) from region 307 (the subtraction of image 302 from selection area 306, which will not be selected) within selection area 306. Similarly, the electronic device can graphically distinguish regions 317 and 318 of selection area 316, and regions 327 and 328 of selection area 326.

The electronic device can distinguish the regions of the selection area using any suitable approach. In some embodiments, the electronic device can provide different graphical representations for each of the regions. For example, the electronic device can provide shading, patterns, hues, colors, fills (e.g., with different patterns or textures), or other graphical patterns in one or both of the regions (e.g., fill animations). In one implementation, the electronic device can provide shading within the non-selected region (e.g., region 307, 317, or 327) to distinguish it from the selected region.

In some embodiments, the electronic device can instead or in addition distinguish the regions by changing the graphical representation of the periphery of each region. The electronic device can provide any suitable representation for the periphery of each region, including for example, using a line along the periphery. The line can be drawn in any suitable manner, including for example using any line thickness, color, opacity, pattern, or any other distinguishing characteristic. In some embodiments, the displayed line can change with time or include an animation (e.g., displaying and hiding dash marks to provide a 'running ants' type animation). To distinguish between the selected and non-selected regions of a selection area, the electronic device can display different types of lines around each of the regions. For example, the selected region can include a 'running ants' animation, while the non-selected region can include a static pattern having a lower opacity.

In some embodiments, there may be an interface between the selected and non-selected regions, for example along a portion of the boundary of the image. The electronic device can select any suitable type of line to identify the interface. For example, the electronic device can display one of the two types of line along the interface (e.g., the line pattern of the selected region, which may be of more interest to the user). As another example, the electronic device can simultaneously display both types of line along the interface. As still another example, the electronic device can display a combination of the types of line, or a different type of line along the interface.

Figure 4:
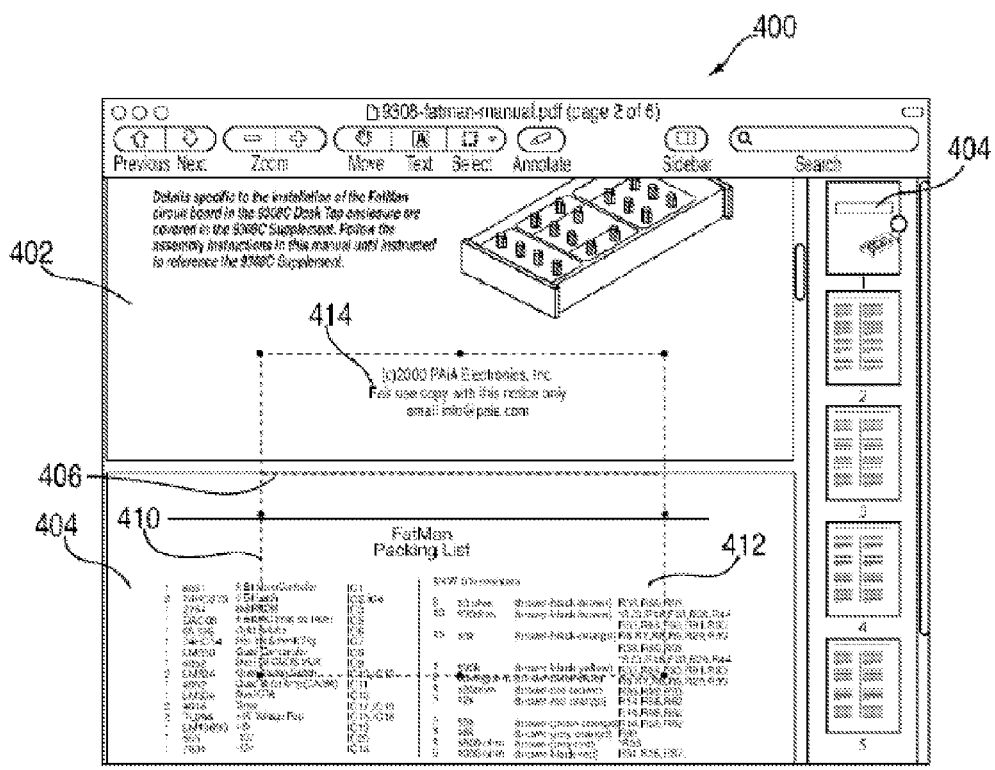
FIG. 4 is a schematic view of an illustrative display of several documents on which a selection area is overlaid in accordance with one embodiment of the invention.

In some embodiments, the selection area can extend between several documents, but only include a selectable region on one of the documents. FIG. 4 is a schematic view of an illustrative display of several documents on which a selection area is overlaid in accordance with one embodiment of the invention. Display 400 can include documents 402 and 404 simultaneously displayed in application window 406. The user can select a portion of one of documents 402 and 404 using selection area 410, which the user can define using any suitable approach. Selection area 410 can be positioned over any suitable portion of one or both of documents 402 and 404. If the user wishes to select only a portion of document 404 (and not document 402), selection area 410 can include selected region 412 extending over document 404, and non-selected region 414 extending beyond the boundary of document 404. The electronic device can use any suitable approach to distinguish regions 412 and 414, including for example any of the approaches discussed above in connection with FIGS. 3A-3C. If the user wishes to select portions of both documents, however, the non-selected region can be limited to the area in application window 406 that is between the documents (e.g., region 416).

Figure 5:
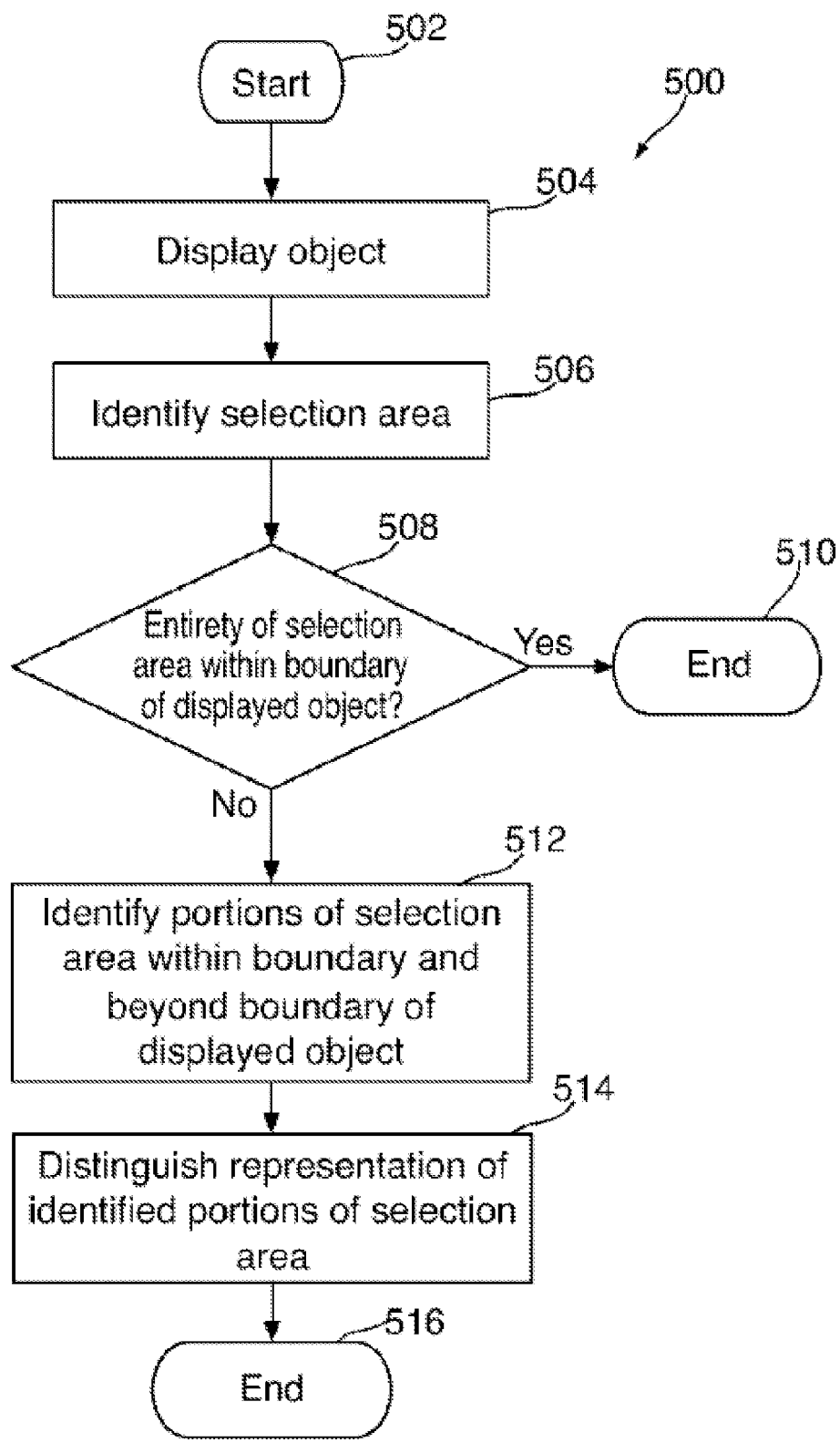
FIG. 5 is a flowchart of an illustrative process for differentiating different regions of a displayed selection area in accordance with one embodiment of the invention.

FIG. 5 is a flowchart of an illustrative process for differentiating different regions of a displayed selection area in accordance with one embodiment of the invention. Process 500 can begin at step 502. At step 504, the electronic device can display an object. For example, the electronic device can display an image, document, or other information that includes boundaries. At step 506, the electronic device can identify a selection area for selecting a portion of the displayed object. The selection area can be defined using any suitable approach, including for example using a selection tool for drawing a selection area. At step 508, the electronic device can determine whether the selection area is positioned entirely within the boundary of the displayed object. For example, the electronic device can determine whether the periphery of the selection area is within the boundary of the displayed object. If the electronic device determines that the entire selection area is within the boundary of the displayed object, process 500 can move to step 510 and end.

If, at step 508, the electronic device instead determines that the entirety of the selection area is not within the boundary of the displayed object, process 500 can move to step 512. At step 512, the electronic device can identify portions of the selection area that are within the boundary of the displayed objects, and portions of the selection area that are beyond the boundary of the selection area. For example, the electronic device can identify the regions of the selection area that are entirely within the boundary of the displayed object, and the regions that extend beyond the boundary. At step 514, the electronic device can distinguish the graphical representation of each of the identified portions of the selection area. For example, the electronic device can provide a different fill for each of the identified regions. As another example, the electronic device can provide different line types around the periphery of the selection area and along the boundary between the identified portions (e.g., and along a portion of the boundary of the displayed object). Process 500 can then end at step 516.

The above described embodiments of the invention are presented for purposes of illustration and not of limitation, and the present invention is limited only by the claims which follow.

What is claimed is:

1. A method comprising:
   displaying an object having a set boundary on a display of an electronic device;
   after displaying the object, receiving with the electronic device a first user input to define a selection area at least partially over the displayed object, the selection area being located at a first position on the display and having a particular shape and a particular size;

after receiving the first user input, detecting with the electronic device that at least a first region of a plurality of regions of the selection area extends beyond the set boundary of the displayed object;

after detecting that that the first region extends beyond the set boundary, displaying the first region of the plurality of regions in a first manner and displaying regions of the plurality of regions other than the first region in a second manner that differs from the first manner;

receiving with the electronic device a second user input to drag the selection area from the first position to a second position on the display while maintaining the particular shape and the particular size of the selection area, the second position differing from the first position;

detecting with the electronic device that at least a second region of a plurality of regions of the selection area extends beyond the set boundary of the displayed object; and displaying the second region of the plurality of regions in the first manner and displaying regions of the plurality of regions other than the second region in the second manner.

2. The method of claim 1 further comprising:

receiving with the electronic device a third user input to drag the drawn selection area while maintaining the particular shape and the particular size of the drawn selection area;

in response to the receiving the third user input, determining with the electronic device that the entirety of the drawn selection area has been dragged to within the set boundary of the displayed object; and in response to the determining, re-drawing with the electronic device the entire selection area in the first manner.

3. Non-transitory computer readable media comprising computer readable code recorded thereon for:

displaying an object having a set boundary on a display of an electronic device;

after displaying the object, receiving with the electronic device a first user input to draw a selection area at least partially over the displayed object, the selection area being located at a first position on the display and having a particular shape and a particular size;

after receiving the first user input, detecting with the electronic device that at least a first region of a plurality of regions of the selection area extends beyond the set boundary of the displayed object;

after detecting that the first region extends beyond the set boundary, displaying the first region of the plurality of regions in a first manner and displaying regions of the plurality of regions other than the first region in a second manner that differs from the first manner;

receiving with the electronic device a second user input to drag the selection area from the first position to a second position on the display while maintaining the particular shape and the particular size of the selection area, the second position differing from the first position;

detecting with the electronic device that at least a second region of a plurality of regions of the selection area extends beyond the set boundary of the displayed object; and displaying the second region of the plurality of regions in the first manner and displaying regions of the plurality of regions other than the second region in the second manner.

4. The non-transitory computer-readable media of claim 3, comprising further computer readable code recorded thereon for:

determining with the electronic device a first periphery of the first region; and determining with the electronic device a second periphery of regions of the plurality of regions other than the first region, wherein the drawing the selection area further comprises:

drawing a first line along the determined first periphery; and drawing a second line along the determined second periphery.

* * * * *

UNITED STATES PATENT AND TRADEMARK OFFICE
CERTIFICATE OF CORRECTION

PATENT NO. : 8,875,035 B2  
APPLICATION NO. : 12/475299  
DATED : October 28, 2014  
INVENTOR(S) : Gehani et al.

Page 1 of 1

It is certified that error appears in the above-identified patent and that said Letters Patent is hereby corrected as shown below:

In the claims,

Claim 1, col. 7, line 7, please delete "detecting that that the" and insert --detecting that the--;

Claim 2, col. 7, line 30, please delete "to the receiving" and insert --to receiving--.

Signed and Sealed this
Twenty-fourth Day of February, 2015

Michelle K. Lee
*Deputy Director of the United States Patent and Trademark Office*